US005867802A

United States Patent [19]

Borza

[11] Patent Number: 5,867,802

[45] Date of Patent: Feb. 2, 1999

[54] BIOMETRICALLY SECURED CONTROL SYSTEM FOR PREVENTING THE UNAUTHORIZED USE OF A VEHICLE

[75] Inventor: Stephen J. Borza, Ottawa, Canada

[73] Assignee: Dew Engineering and Development Limited, Ottawa, Canada

[21] Appl. No.: 691,537

[22] Filed: Aug. 2, 1996

[30] Foreign Application Priority Data

Aug. 16, 1995 [CA] Canada .................................. 2156236

[51] Int. Cl.$^{6}$ ........................................ B60R 25/10

[52] U.S. Cl. ................................ 701/35; 701/29; 701/32; 340/426; 340/825.3; 307/10.2; 307/10.3

[58] Field of Search .................................... 701/1, 29, 32, 701/33, 35; 340/425.5, 426, 438, 825.29, 825.3, 825.31, 825.32, 825.34; 307/10.2, 10.3, 10.5, 10.6

[56] References Cited

U.S. PATENT DOCUMENTS

| | | | |
|---|---|---|---|
| 4,353,056 | 10/1982 | Tsikos | 340/146.3 |
| 5,325,442 | 6/1994 | Knapp | 382/4 |
| 5,661,451 | 8/1997 | Pollag | 340/426 |
| 5,686,765 | 11/1997 | Washington | 307/10.5 |
| 5,745,046 | 4/1998 | Itsumi et al. | 340/825.31 |

FOREIGN PATENT DOCUMENTS

| | | |
|---|---|---|
| 2167342 | 7/1996 | Canada . |

*Primary Examiner*—Tan Q. Nguyen
*Attorney, Agent, or Firm*—Neil Teitelbaum & Associates

[57] ABSTRACT

A method and system are provided for restricting the use of a vehicle such as an automobile to a person or persons whose fingerprints match biometric data stored within a memory in the vehicle's control system. A user's digitized fingerprints are stored in a non-volatile permanent ROM in the BIOS of a microcontroller on in a ROM accessed by a microprocessor. The microprocessor's primary task is that of executing instructions related to the operation of the vehicle, such as regulating the fuel flow rate, and performing other such tasks. Before the microprocessor can execute its instructions related to its primary task it, must complete and exit a conditional loop of instructions that relate to validating a user's "real-input" biometric data. Real scanned fingerprints must be compared with fingerprint(s) stored in ROM. If the result of the compare is a true, i.e. is a match, then the conditional loop is satisfied and the microprocessor can execute its instructions relating to operating the vehicle.

20 Claims, 5 Drawing Sheets

BIOMETRICALLY SECURED CONTROL SYSTEM FOR PREVENTING THE UNAUTHORIZED USE OF A VEHICLE

FIELD OF THE INVENTION

This invention relates to secure control systems and more particularly to a system and method for acquiring use of a device dependent upon biometric related input.

BACKGROUND OF THE INVENTION

The use of security systems is generally well known. There use is becoming even greater with increased availability of digital electronic components at a relatively low cost. Such systems are known for securing buildings, banks, automobiles, computers and many other devices. For example, U.S. Pat. No. 4,951,249 discloses a computer security system which protects computer software from unauthorized access by requiring the user to supply a name and a password during the operating system loading procedure ("boot-up") of a personal computer (PC). This is accomplished by the insertion of a special card into an input/output expansion slot of the PC. During the loading of the operating system of the PC, the basic input/output system (BIOS) scans memory addresses of the card for an identification code, consisting of a 55AA hex code. When this hex code is located, the BIOS instructions are vectored to the address where the target hex code resides and instructions at the following address are executed as part of the initialization routines of the system boot-up procedure.

This PC security system, utilizing a password board, is typical of many systems that are currently available. Password boards require a user's name and a password associated with that user's name. Only once a password board detects a valid user's name and password does it allow the PC to complete the boot-up routine. Though password boards may be useful in some instances, they are inadequate in many respects.

For example, an unauthorized skilled user with a correct password in hand, can gain entry to such a processor based system. Yet another undesirable feature of the foregoing system is that passwords on occasion are forgotten; and furthermore, and more importantly, passwords have been known to be decrypted.

As of late one of the most ubiquitous electronic components is the digital processor. Multi-purpose and dedicated processors of various types control devices ranging from bank machines, to cash registers and automobiles. With ever increasing use of these processor based devices, there is greater concern that unauthorized use will become more prevalent. Thus, the verification and/or authentication of authorized users of processor based systems is a burgeoning industry.

Alarms and security systems to warn of unauthorized use of automobiles and other processor controlled systems are available, however, these security systems have been known to be circumvented. Furthermore, automobile alarms that sound, are often ignored by passers-by. Unfortunately, many commercially available solutions aimed at preventing theft or unauthorized use of automobiles have also been circumvented.

Thus, it is an object of this invention to provide a method and relatively inexpensive system for preventing unauthorized use of a vehicle controlled by a processor based control system.

SUMMARY OF THE INVENTION

The foregoing problems are solved by a method and apparatus for controlling access to a processor controlled device in which memory-resident software logic cooperates with an input device providing "real-input" biometric data to the processor's input port disabling the controlled device unless authorized user biometric data that corresponds to data stored in the processor's memory is provided to the processor. According to a departure in the art, memory resident software logic is executed by the device processor; the execution of a user verification loop is repeated until an authorized user biometric key is provided. thereby preventing the device processor from executing its normal functions unless the result of a compare operation of "real-input" biometric data with stored biometric data is true. The processor normally controlling vital functions of the automobile, such as fuel delivery is internally halted unless "real-data" from an authorized user is provided.

Operation of the memory-resident software logic is transparent to the user and to the control programs that normally control the processor controlled device because it is installed as a boot-up routine when the device is switched-on. At this time, the logic continuously monitors a biometric input device, for example in the form of a fingerprint scanner, for "real" input data.

Operation of the device remains suspended until the memory-resident logic detects authorized fingerprint data that compares positively with fingerprint data stored in the memory.

Another advantage achieved with the invention is ready adaptability of the system to commercially available processor controlled vehicles.

In accordance with the invention, a biometrically secured control system is provided, for preventing an unauthorized use of a vehicle comprising: processor means for controlling functions normally associated with the operation of a device; memory means for storing biometrically related data and for storing instructions related to controlling at least some normal operations of the device; biometric data input means for providing "real-input" biometrically related data to one of the memory means and the processor; and means for preventing the processor from, or allowing the process to, execute instructions related to controlling at least the functions normally associated with the operation of the device in dependence upon the state of a compare operation, after a comparison has been performed between "real-input" and previously stored biometrically related data.

Yet in accordance with another aspect of the invention a method is provided of validating a user of a vehicle and for allowing a control system of the device to be operable after validation. The method comprises the steps of receiving a user's biometrically related data from an input device; comparing at least an aspect of the received biometrically related data with stored biometrically related data; preventing a processor from executing instructions normally related to the operation of the device when the compared data mis-matches within predetermined limits; and, allowing the processor to execute instructions normally related to the operation of the device after the compared data matches, within predetermined limits.

BRIEF DESCRIPTION OF THE DRAWINGS

Exemplary embodiments of the invention will now be described in conjunction with the drawings in which.

DETAILED DESCRIPTION

Figure 1:
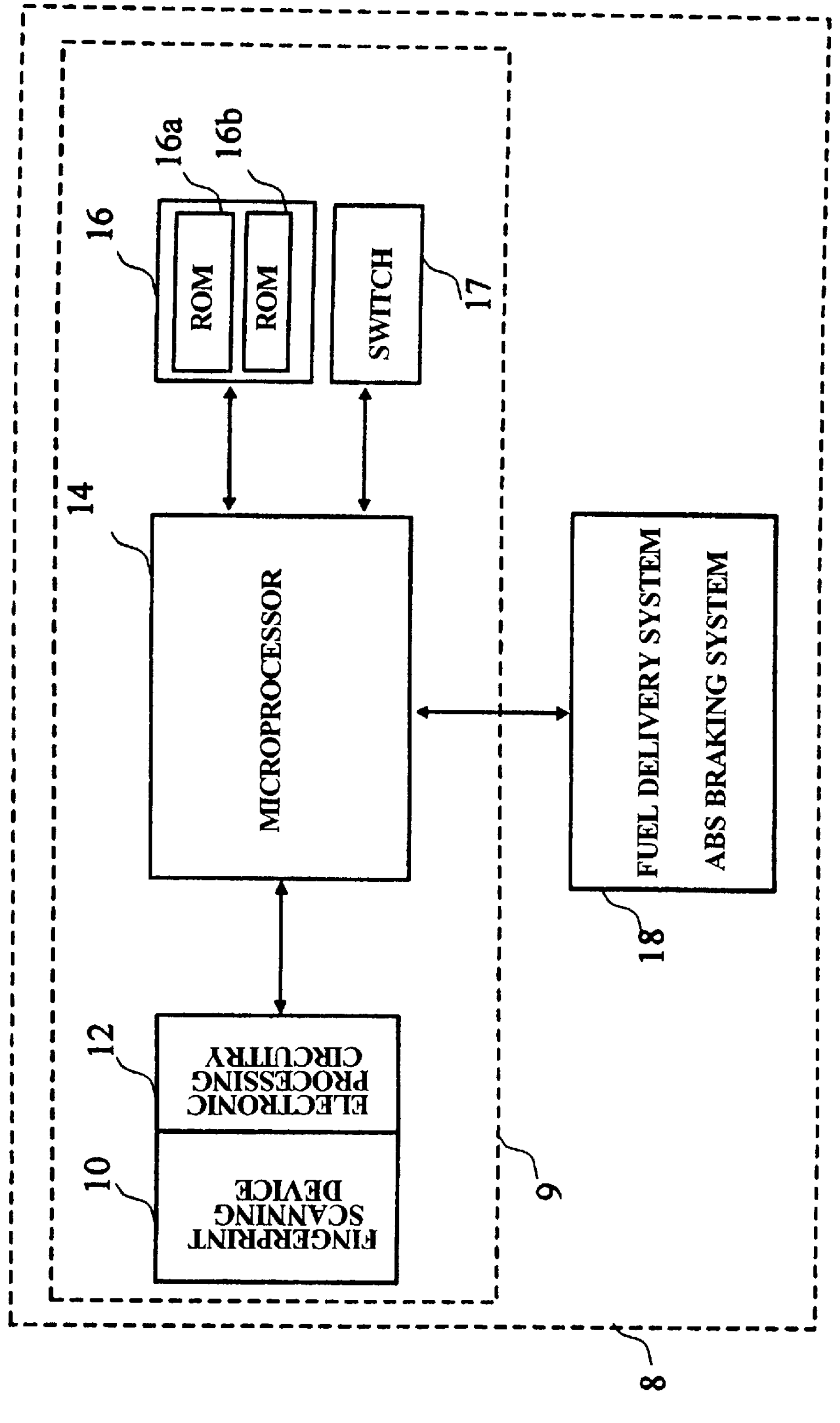
FIG. 1 a block diagram of a security system in accordance with the invention shown having a microprocessor coupled to a fingerprint scanning device.

FIG. 1 illustrates a processor based system (PBS) 8 which is modified in accordance with the invention to prevent unauthorized usage of one or more devices 18 related to the operation of a vehicle. For example block 18 shown in FIG. 1 may represent the fuel delivery system and/or the ABS braking system of a vehicle. The reference numeral 9 designates generally a system of the present invention for providing these controlled access and monitoring functions. The system 9 includes biometric data input means in the form of a fingerprint scanning device 10 and associated, electronic-processing circuitry 12 shown coupled to a microprocessor 14; memory means in the form of a read-only memory (ROM) 16 is conveniently logically segmented into a first and second logical blocks 16*a* and 16*b* respectively, the first of which is for storing BIOS and program instructions implementing logic routines that in certain instances prevent a processor 14 from executing instructions normally associated with controlling the one or more devices 18. A second logical memory block 16*b* contains instructions that relate to the control and operation of the one or more devices 18.

In the instance where this system is used to control operations related to a vehicle, in a normal, authorized, mode of operation, the processor 14 controls the vehicle's ignition system, braking system, and fuel delivery system. A key-operated ignition switch 17 is coupled to the processor to provide a signal for providing power to the processor 14 and for invoking the BIOS start-up sequence of instructions stored in boot-up portion 16*a* of the ROM 16.

Figure 2:
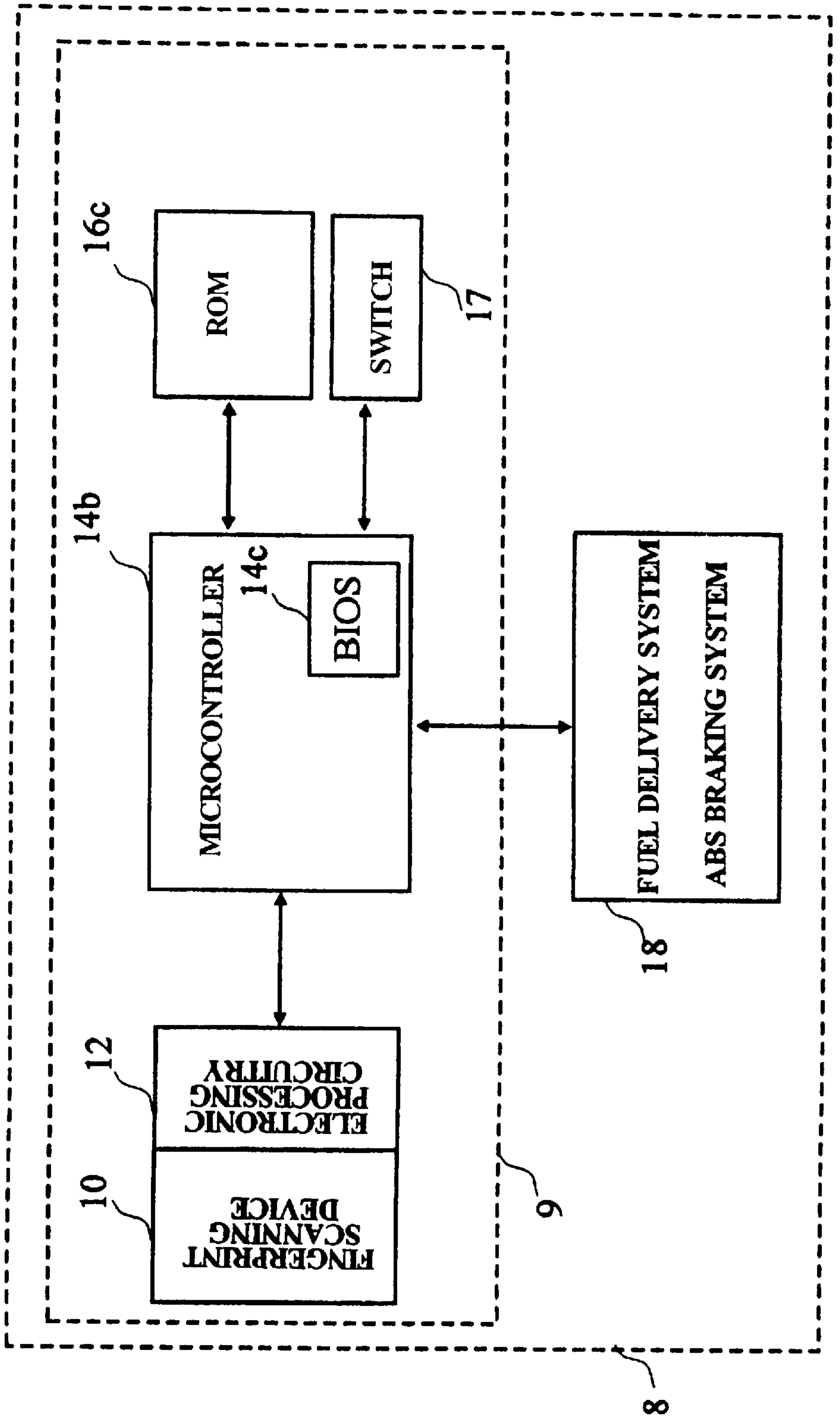
FIG. 2 of a block diagram of an alternative embodiment of a security system having a microcontroller coupled to a fingerprint scanning device in accordance with this invention.

Referring now to FIG. 2, an alternative embodiment is shown wherein a scanning device 10 and associated circuitry 12 is coupled to a microcontroller 14*b* having the BIOS stored within the microcontroller's internal memory 14*c*. External ROM 16*c* is coupled to the processor and is stored with instructions related to the control of one or more devices 18. In this embodiment, the BIOS essentially comprises input/output routines, sanity checks, and more importantly, the set of program instructions implementing logic routines that in certain instances prevent the microcontroller 14*b* from executing instructions normally associated with controlling the one or more devices 18. In practice, if the processor execution remains in a loop, in its verification sequence of instructions stored in the BIOS, fuel is not supplied to the vehicle. Since the fuel injectors are electronically controlled by the processor, the vehicle is immobilized until the processor receives and verifies biometric input data that corresponds to stored authorized user's data.

Figure 3:
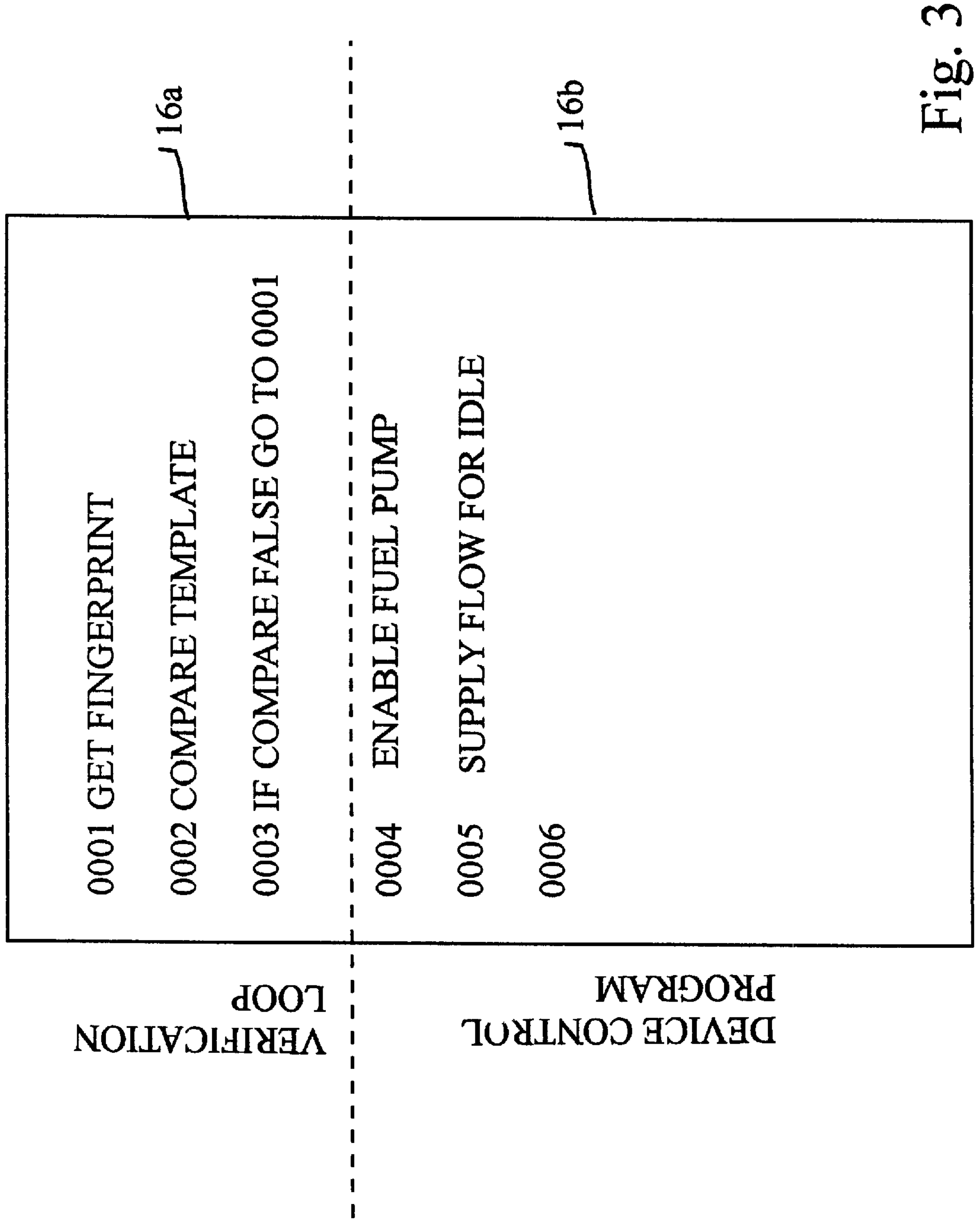
FIG. 3 is an illustration depicting the basic system operation, showing program segmentation.

Turning now to FIG. 3, a block diagram is shown of a portion of the basic pseudo code control program that is stored in ROM 16*a* for determining whether or not associated instructions that control the one or more devices 18 will be executed. It should be noted in this example, that the instructions are merely exemplary and each pseudo-code instruction may comprise several micro-instructions. Of course, the technical aspects of programming of such instructions is well known and within the capability of those skilled in the programming arts. In this example a first pseudo-code instruction, GET FINGERPRINT, requires several micro-instructions to be performed in order to accomplish this task. However, the explanation of the invention becomes more clear using these high level pseudo-code instructions. In this embodiment, a first (pseudo code) instruction at memory address 0001, GET FINGERPRINT is fetched and executed by the processor or microcontroller. As a result of executing this instruction, the fingerprint device is polled for input. Whether or not a fingerprint is available, input is received from the scanning device 10 and its associated circuitry 12. A next instruction, COMPARE TEMPLATE, at memory address 0002 is fetched from memory and executed. Essentially this pseudo-code instruction directs the processor to compare "real-input" data that has been electronically formatted into a standard digital representation. with an electronically stored fingerprint represented in a same format. If the result of the compare instruction is true, that is if the "real-input" data is determined to be the same, within a predetermined margin of error, as the stored fingerprint data, the processor begins fetching instructions from the block of memory 16*b* associated with the normal operation of device 18. In the instance that the compare result is false, the processor 14 sets its instruction counter to 0001, and loops to fetch instructions starting at address 0001; the processor remains in this loop comprising instructions at address 0001 through 0003 until the compare result is true. The optional key-switch 17 shown in FIG. 1 is provided to switch the processor and overall system on and off.

In the embodiments shown heretofore, read only memory is provided. Thus, the electronically stored (compare template) fingerprint, is permanently stored in the ROM 16*a*, 16*b*, or in the BIOS portion of the memory as may be the case.

Figure 4:
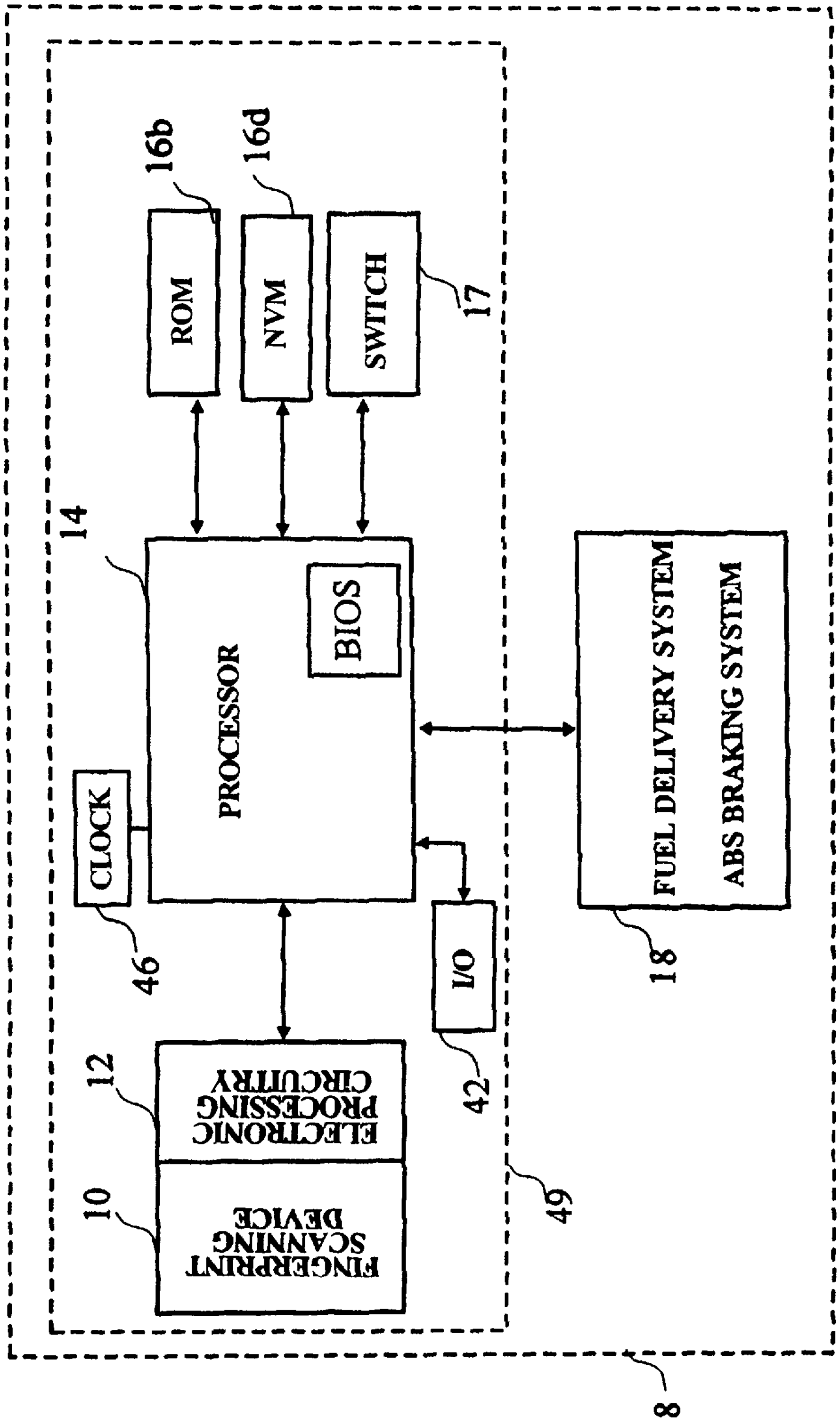
FIG. 4 is a block diagram of an alternative embodiment of a security system having user programmable features, and, FIG. 5 is a high-level flowchart depicting a part of a routine for validating a user and for operating a vehicle.
Figure 5:
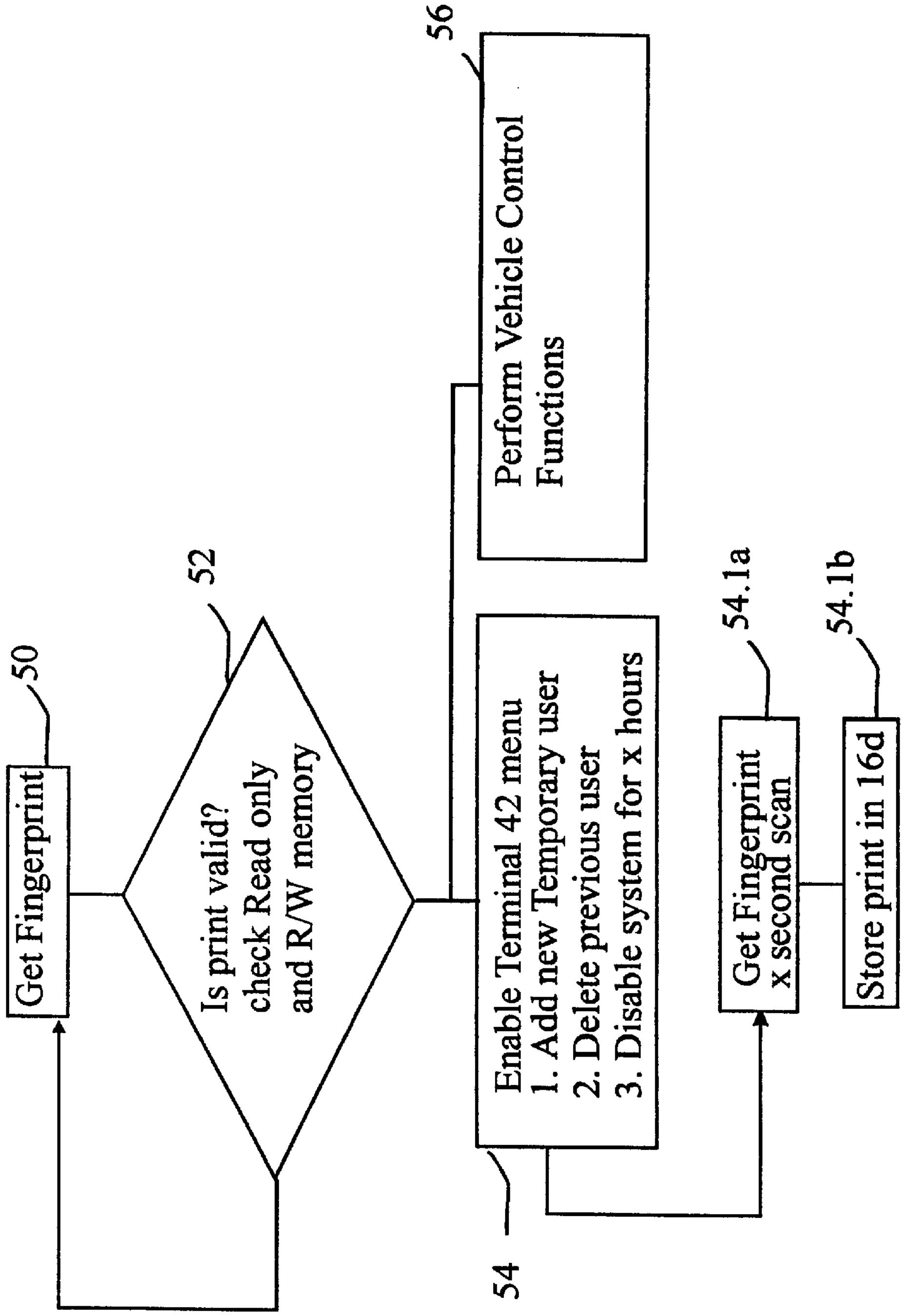

However, in an alternative embodiment shown in FIG. 4, non-volatile read/write memory 16*d* is present to provide a more flexible and user programmable system 49. The system 49 is similar to that of 9 in FIG. 1 however includes an input/output device 42, in the form of a display terminal coupled to the processor 14. In operation, once the verification loop comprising the instructions GET FINGERPRINT, COMPARE TEMPLATE, is exited and verification has been made authenticating a user, the display terminal 42 becomes enabled. Instructions associated with the use of the display terminal in the form of a menu. are stored in the memory 16*b* and are presented to a user on the display terminal. Non-volatile read/write memory 16*d* is provided to store input information such as temporary users biometric input data. When the system is switched off and powered down by the switch 17, biometric data stored in the memory 16*d* will remain. A menu (a portion of which is shown in FIG. 5) is provided on the display terminal 42 to allow a temporary user to be logged into the system for a predetermined period of time, thereby allowing a temporary user to use the vehicle. Upon selecting this option, the temporary user is prompted to place a finger on the scanner 10 within x seconds so that "real-input" data can be acquired. The data is then stored in the memory 16*d* for a predetermined period of time. However, temporary users can only provide their "real-input" data to the system after a permanent user has successfully passed the verification loop of instructions. A real time clock 46 coupled to the processor presents the time of day to the processor 14 so that temporary user's biometric data can be erased after the expiration of its allotted time period. Alternatively, the menu provides an option for a temporary user to be deleted from the system. This embodiment can more readily be understood in conjunction with the flow chart of FIG. 5. Upon power-up, the processor 14 first checks the time of day and erases those entries from memory that have expired; (this is not shown in FIG. 5.) The processor then executes GET FINGERPRINT at 50 and compares at 52 the real-input data with all of its stored fingerprint data. Upon passing the verification loop, a menu is provided at 54; furthermore, the vehicle control functions are enabled at 56. The menu has a plurality of functions, only a few of which are illustrated at 54. Menu option 1 for example invokes a routine to get a fingerprint of a temporary user and store it in 16*d*; (see 54.1 and 54.1*b* in FIG. 5*a*.) Other options may also be provided at 54. For example, instructions can be selected by a permanent user after authentication has taken place, to limit or restrict a temporary user's access to particular functions. For instance a permanent user may limit the fuel flow rate to a predetermined maximum, thus essentially preventing the vehicle from exceeding a maximum speed.

This option may be selected, for example when a valet is given temporary use of the vehicle. Furthermore, instructions may be selected that prevent temporary users from utilizing the radio or other features and options.

Alternatively, a permanent user may disable the system for a predetermined period of time to allow any users to utilize the system without regard to input data as long as the ignition key switch 17 is enabled.

The system defined heretofore ensures that the processor 14 will be prevented from executing instructions related to controlling devices associated with a system, unless a block of instructions related to verification and authentication of one or more users has been successfully executed and all required conditions are met. Expressed in a different way, the processor locks itself in a verification loop, rejecting the execution of its normal routines, until a correct biometric key in the form of biometric data is presented to it.

In the examples shown heretofore, in accordance with the invention, a scheme having sequential instructions is shown for simplicity, however, pointers, flags, and semaphores can be utilized in a similar system wherein branching and jumping to non-sequential blocks of memory is performed. Thus, the verification loop need not be the first block of instructions executed, and similarly the control block of instructions need not be the second block of instructions executed, however the verification loop of instructions should be executed prior to executing the vehicle control instructions as an authorization check to ensure that the vehicle control instructions should be executed.

Advantageously, having a same processor control access to a vehicle and the operation of the vehicle, provides a highly secure system. If in an unauthorized attempt to tamper with and use the vehicle the processor becomes damaged, it will then not provide its required functions, for example, controlling the fuel supply to the vehicle. If in an authorized attempt to use the vehicle the processor and memory were replaced with another processor and memory, the replacement memory would have to be compatible with the processor and control devices and suitably programmed to control the required functions relating to the operation of a vehicle; this scenario is highly unlikely.

Of course, numerous other features and embodiments may be envisaged without departing from the spirit and scope of the invention.

What I claim is:

1. A user programmable biometrically secured control system for preventing an unauthorized use of a vehicle comprising:

a user programmable processor for controlling functions normally associated with the operation of a device within a vehicle;

memory for storing biometrically related data and for storing parameters and instructions related to controlling at least some normal operations of the device;

user programmable means for programming biometrically related data stored in the memory and parameters associated with stored biometrically related data, the parameters for limiting execution of functions normally associated with the operation of the vehicle stored in the memory;

biometric data input sensor for providing "real-input" biometrically related data to one of the memory and the user programmable processor; and, means for preventing the processor from, and allowing the process to, execute instructions in accordance with the stored parameters associated with the biometric data input related to controlling at least the functions normally associated with the operation of the vehicle in dependence upon the result of a compare operation, after a comparison has been performed between "real" and previously stored biometrically related data.

2. A user programmable biometrically secured control system as defined in claim 1, wherein said means for preventing the processor from executing instructions includes a user programmable control sequence of instructions.

3. A user programmable biometrically secured control system as defined in claim 1, wherein said biometric data input means comprises a fingerprint scanning input device.

4. A user programmable biometrically secured control system as defined in claim 2, wherein said user programmable control sequence of instructions for preventing the processor from executing instructions includes associated instructions for acquiring "real-input" biometric data and for determining if acquired "real-input" biometric data matches stored biometric data within predetermined limits.

5. A user programmable biometrically secured control system as defined in claim 4, wherein the operation of the vehicle is prevented until a suitable match occurs between acquired "real" biometric related data, and stored biometric data.

6. A user programmable biometrically secured control system as defined in claim 1, wherein the biometric data input means are provided to at least input biometric data of an authorized user to be stored in the memory for later comparison with "real" input data.

7. A user programmable biometrically secured control system as defined in claim 1, including an input terminal for programming the control system.

8. A user programmable biometrically secured control system as defined in claim 7, wherein the input terminal includes a key-pad and a display.

9. A user programmable biometrically secured control system as defined in claim 8, wherein the normal operation of the input terminal is dependent upon a positive compare result after a comparison has been performed between "real-input" and stored biometrically related data.

10. A user programmable biometrically secured control system as defined in claim 1, including means for allowing biometric data of a temporary user to be logged into the system for a predetermined period of time.

11. A user programmable biometrically secured control system as defined in claim 1, including means for allowing biometric data of a user to be logged into the system with associated parameters for limiting execution of the functions normally associated with the operation of the vehicle.

12. A method of validating a user of a vehicle and for allowing a user programmable biometrically secured control system of the vehicle to be operable after said validation, comprising the steps of:

receiving a user's biometrically related data from an input device;

comparing at least an aspect of the received biometrically related data with stored biometrically related data;

preventing a processor from executing instructions normally related to the operation of the vehicle when the compared data mis-matches within predetermined limits; and, allowing the processor to execute instructions normally related to the operation of the vehicle after the compared data matches, within predetermined limits, wherein at least one of the stored biometrically related data and the instructions are user programmable.

13. A method as defined in claim 12, comprising the steps of:

receiving a user's biometrically related data from an input device;

comparing at least an aspect of the received biometrically related data with stored biometrically related data to produce a comparison result; and, when the comparison result is indicative of a match, receiving from the input device a second user's biometric data for registration, and programming the biometrically secured control system with data relating to the received biometric data from the second user.

14. A method as defined in claim 12, wherein the step of comparing the data is performed by logic circuitry within the processor.

15. A method as defined in claim 12, further comprising the step of providing a temporary authorized user's biometrically related data to a memory for storage.

16. A method as defined in claim 12 further comprising the step of providing an authorized user's biometrically related data to a memory for storage after the processor has been allowed to execute instructions normally related to the operation of the vehicle.

17. A method as defined in claim 15 further comprising the step of providing a time interval to the processor relating to the allotted time a temporary authorized user may be validated to operate the vehicle.

18. A method as defined in claim 16 further comprising the step of providing a time interval to the processor relating to the allotted time an authorized user may be validated to operate the vehicle.

19. A method as defined in claim 16, further comprising the step of deleting automatically a authorized user's biometrically related data from the memory.

20. A method as defined in claim 12, comprising the steps of:

receiving a user's biometrically related data from an input device;

comparing at least an aspect of the received biometrically related data with stored biometrically related data to produce a comparison result;

when the comparison result is indicative of a match, allowing the user to program the control system.

* * * * *